(12) United States Patent
Yu

(10) Patent No.: US 12,609,547 B2
(45) Date of Patent: Apr. 21, 2026

(54) CHARGING CUPHOLDER FOR SECURING MULTIPLE ITEMS

(71) Applicant: Travelers Club Luggage, Inc., La Palma, CA (US)

(72) Inventor: Peter Yu, La Palma, CA (US)

(73) Assignee: Travelers Club Luggage, Inc., La Palma, CA (US)

( * ) Notice: Subject to any disclaimer, the term of this patent is extended or adjusted under 35 U.S.C. 154(b) by 16 days.

(21) Appl. No.: 18/414,214

(22) Filed: Jan. 16, 2024

(65) Prior Publication Data

US 2025/0233434 A1 Jul. 17, 2025

(51) Int. Cl.
| | |
|---|---|
| *H02J 7/00* | (2006.01) |
| *A45C 5/03* | (2006.01) |
| *A45C 5/14* | (2006.01) |
| *A45C 13/00* | (2006.01) |
| *A45C 13/26* | (2006.01) |
| *A45C 15/00* | (2006.01) |
| *H02J 7/70* | (2026.01) |

(52) U.S. Cl.
CPC ................ *H02J 7/751* (2026.01); *A45C 5/03* (2013.01); *A45C 5/14* (2013.01); *A45C 13/001* (2013.01); *A45C 13/262* (2013.01); *A45C 15/00* (2013.01); *A45C 2013/267* (2013.01)

(58) Field of Classification Search
CPC . H02J 7/0045; A45C 5/03; A45C 5/14; A45C 13/001; A45C 13/262; A45C 15/00; A45C 2013/267
See application file for complete search history.

(56) References Cited

U.S. PATENT DOCUMENTS

| | | | | | |
|---|---|---|---|---|---|
| 5,003,725 | A | * | 4/1991 | Maddox ................... | A01G 5/04 |
| | | | | | 248/312.1 |
| 5,167,392 | A | * | 12/1992 | Henricksen ............ | B60N 3/106 |
| | | | | | 403/92 |
| 5,423,508 | A | * | 6/1995 | Isenga .................... | B60N 3/108 |
| | | | | | 224/407 |
| 5,671,877 | A | * | 9/1997 | Yabuya ................... | B60N 3/102 |
| | | | | | 224/483 |
| 6,076,793 | A | * | 6/2000 | Yamamoto ............. | B60N 3/106 |
| | | | | | 248/315 |
| 10,128,671 | B2 | * | 11/2018 | Yu ...................... | A47G 23/0225 |

* cited by examiner

*Primary Examiner* — Tri M Mai
(74) *Attorney, Agent, or Firm* — LEE, HONG, DEGERMAN, KANG & WAIMEY

(57) ABSTRACT

Provided is a charging cup holder including a fixing base, a pair of arms hinged to an upper end of the fixing base and configured to secure a cup, a cup carrier hinged to a lower end of the fixing base, and a USB interface provided at the fixing base and configured to transfer electric power from a first side of the USB interface to a second side of the USB interface, wherein the cup carrier comprises opposing raised side edges shaped to form pairs of corresponding securing grooves to provide a securing position for a personal item placed on the fixing base. The charging cup holder may be implemented in a luggage article including a body having a top face, a bottom face, and a plurality of side faces, at least two wheels disposed at the bottom face of the body, an extendable handle, and the charging cup holder disposed at one of the plurality of side faces.

16 Claims, 7 Drawing Sheets

200

302 200 130

CHARGING CUPHOLDER FOR SECURING MULTIPLE ITEMS

BACKGROUND OF THE INVENTION

Cup holders are used for placing a cup, bringing convenience to people's lives because they are available to be carried around. In addition, with the popularity of intelligent devices, the problem of mobile terminal charging and securing mobile terminals conveniently has become widespread. The single function of the existing cup holders cannot satisfy the various demands of people. Accordingly, it will bring further convenience for people's lives to provide a cup holder with additional functions of securing a cup, securing a mobile terminal, charging a mobile terminal, and securing additional personal items. Such a cup holder may provide convenience and utility in situations where a user is on the move, such as on the side of a personal travel luggage bag.

BRIEF SUMMARY OF THE INVENTION

The technical problem to be solved by the present invention is to overcome the defects of the single function of the current cup holder by providing a charging cup holder with securing grooves for securing various personal items such as a mobile device, or hanging bags.

The present invention solves the above technical problem by providing the following technical solutions:

A charging cup holder according to an embodiment of the present disclosure may include a fixing base; a pair of arms hinged to an upper end of the fixing base and configured to secure sides of a cup; a cup carrier hinged to a lower end of the fixing base and configured to support a bottom of the cup; and a USB interface provided at the fixing base and configured to transfer electric power from a second side of the USB interface to a first side of the USB interface, wherein the cup carrier comprises opposing raised side edges shaped to form pairs of corresponding securing grooves to provide a securing position for a personal item placed on the fixing base.

According to an embodiment, the USB interface is configured to transfer the power from a power source electrically connected to the second side of the USB interface to a mobile device electrically connected to the first side of the USB interface.

According to an embodiment, each of the securing grooves is separated by an upward protrusion to define the securing grooves therebetween.

According to an embodiment, the upward protrusion is formed to have an angled edge angled toward the fixing base to allow tilting of the mobile device against the angled edge.

According to an embodiment, an upper surface of the cup carrier comprises a plurality of raised ridges each configured to provide a resting surface for a bottom edge of the mobile device when the mobile device is propped up against the fixing base.

According to an embodiment, the pair of arms is configured to hinge downward to a closed position toward the fixing base, and the cup carrier is configured to hinge upward to a closed position toward the fixing base to cover the pair of arms.

According to an embodiment, the fixing base comprises an upper hinge portion to which the pair of arms are coupled, and each of the pair of arms are independently laterally rotatable with respect to the upper hinge portion to secure various cup sizes between the pair of arms.

According to an embodiment, the upper hinge portion comprises a pair of springs corresponding to the pair of arms to apply a biasing force to return rotation of the arms to a default position.

According to an embodiment, a front side of the cup carrier comprises at least one wall protruding upward when the cup carrier is in an open position with respect to the fixing base.

According to an embodiment, the at least one wall of the front side of the cup carrier covers at least a portion of an upper surface of the upper hinge portion of the fixing base when the cup carrier is in the closed position.

According to an embodiment, the cup carrier comprises a protruding lip to facilitate opening the cup carrier from the closed position, and the at least one wall is divided by an opening corresponding to a position of the protruding lip.

According to an embodiment, the at least one wall is configured to secure a lower portion of a mobile terminal being propped up against the fixing base.

According to an embodiment, the raised side edges of the cup carrier are further shaped to form a pair of corresponding hanging grooves positioned closest to the fixing base with respect to the pairs of corresponding securing grooves.

According to an embodiment, the pair of corresponding hanging grooves are shaped differently from the pairs of corresponding securing grooves, and are positioned closest to the fixing base to provide a securing position for hanging a handle of a bag.

The present disclosure includes an embodiment of a luggage article comprising a charging cup holder, the luggage article comprising: a body having a top face, a bottom face, and a plurality of side faces, at least two wheels disposed at the bottom face of the body; an extendable handle; and a charging cup holder disposed at one of the plurality of side faces, the charging cup holder comprising: a fixing base; a pair of arms hinged to an upper end of the fixing base and configured to secure a cup; a cup carrier hinged to a lower end of the fixing base; and a USB interface provided at the fixing base and configured to transfer electric power from a second side of the USB interface to a first side of the USB interface, wherein the cup carrier comprises opposing raised side edges shaped to form pairs of corresponding securing grooves to provide a securing position for a personal item placed on the fixing base.

According to an embodiment, the USB interface is configured to transfer the power from a power source electrically connected to the second side of the USB interface and provided internal to the one of the plurality of side faces, to a mobile device electrically connected to the first side of the USB interface.

According to an embodiment, the extendable handle extends along a rear face of the plurality of side faces, and the charging cup holder is provided at the rear face.

The charging cup holder may not only place the cup, but also mobile terminals can be placed in the cup holder conveniently, such as mobile phones, to realize charging easily by electrically connecting to the USB interface on the fixing base.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

The preferable embodiment will be described combined with figures to illustrate the present invention more precisely and completely.

Figure 1:
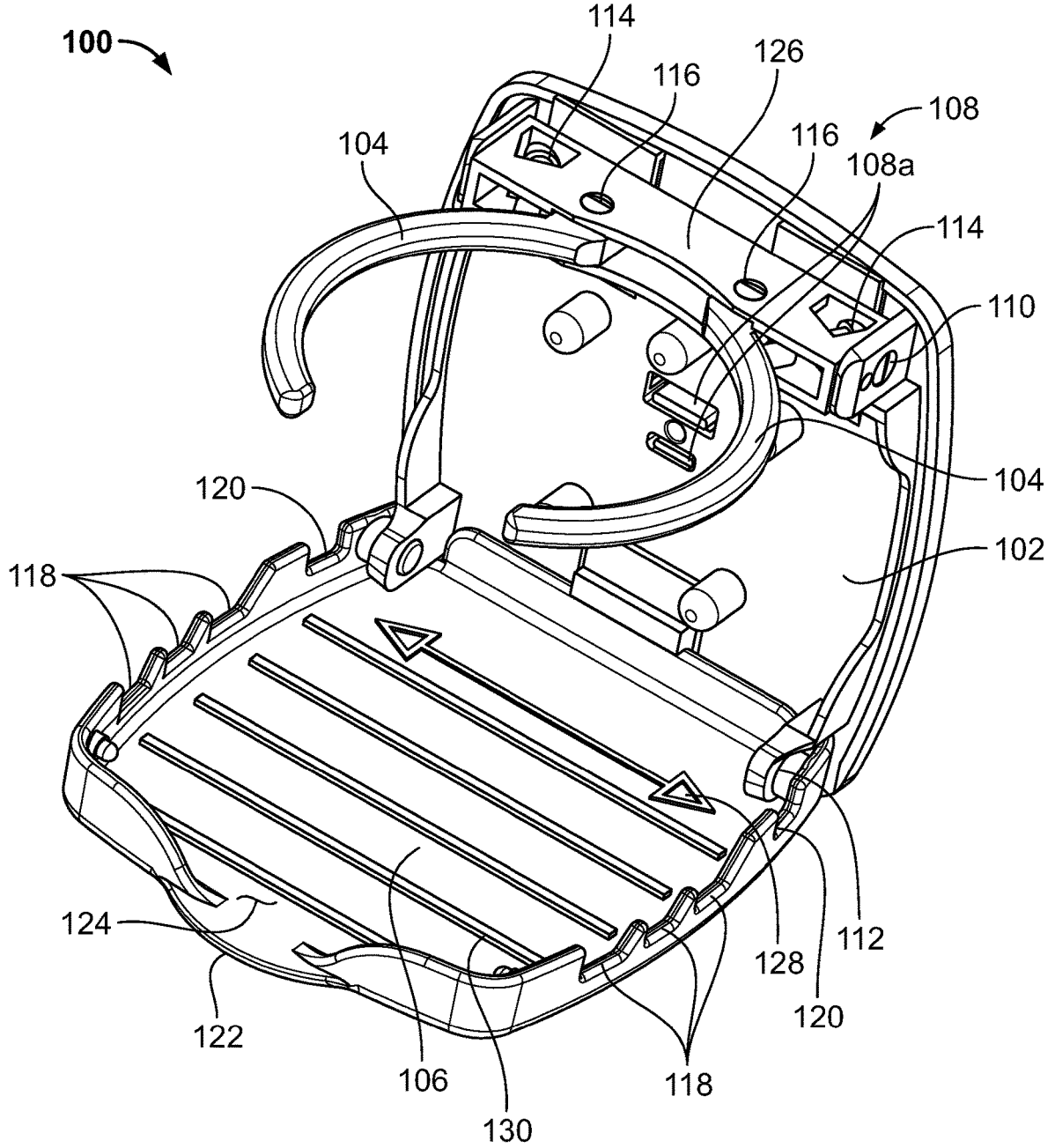
FIG. 1 is a perspective structural view of the charging cup holder.
Figure 2:
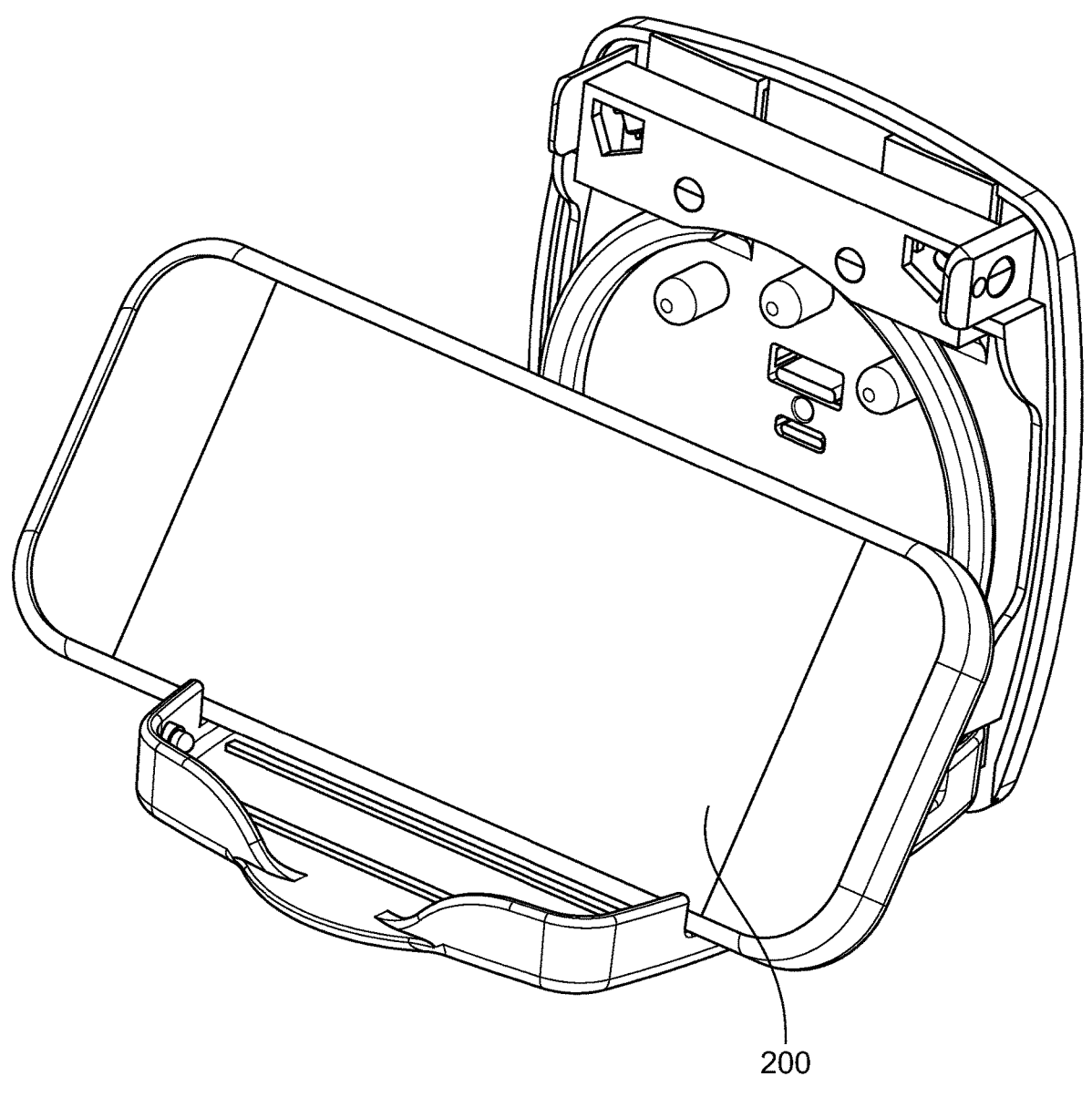
FIG. 2 is a view of the cup holder supporting a mobile device, according to an embodiment of the present disclosure.
Figure 3:
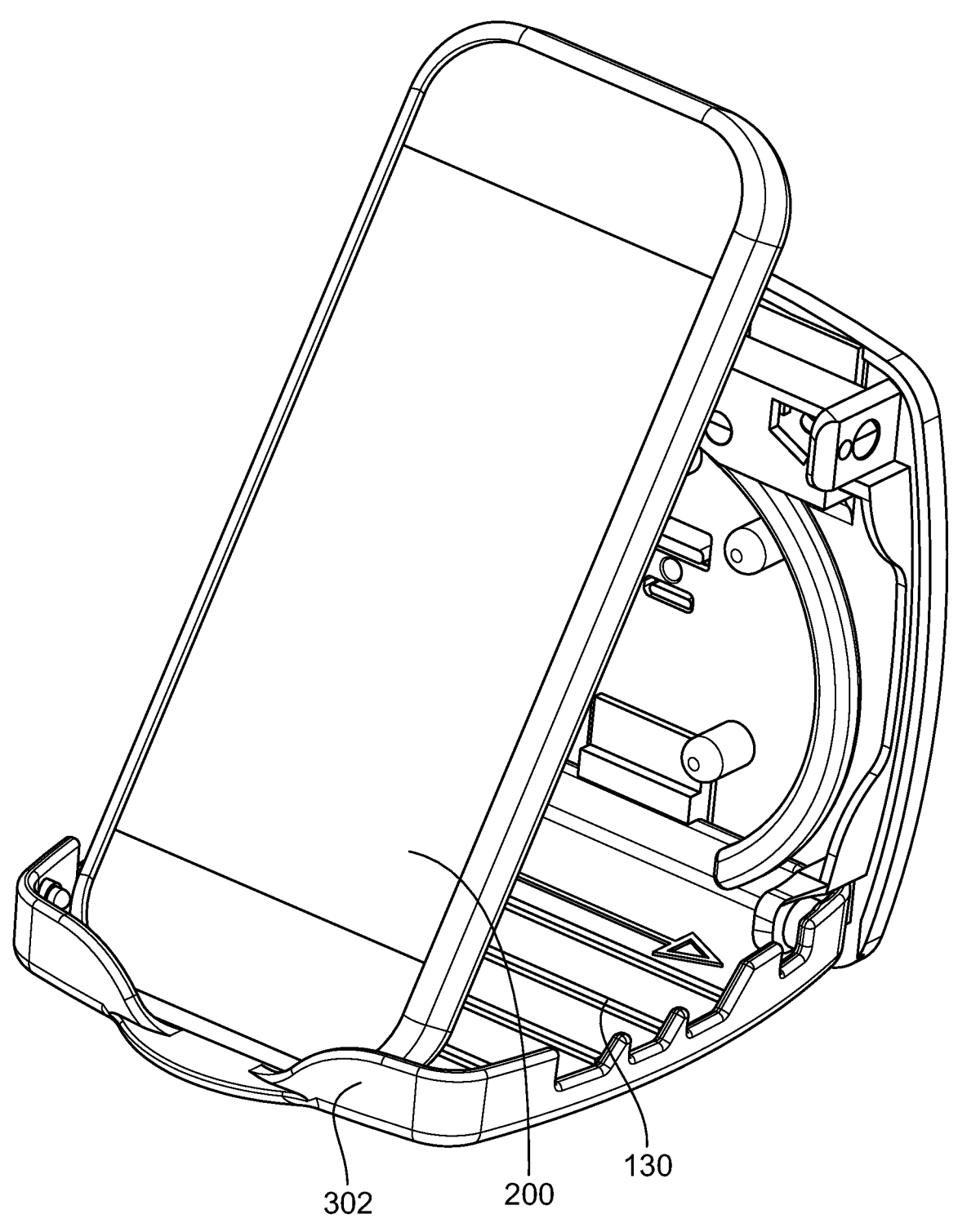
FIG. 3 is a view of the cup holder supporting the mobile device in an alternate orientation, according to an embodiment of the present disclosure.

As shown in FIGS. 1-3, a charging cup holder 100 is provided with a fixing base 102, a pair of arms 104, and a cup carrier 106. The pair of arms 104 are hinged to the upper end of the fixing base 300 via an upper hinge 110. In an embodiment, the pair of arms may be coupled to an arm base 126, to which the pair of arms are coupled, and which is hinged to the fixing base 102. In another embodiment (not depicted), the pair of arms 104 may be directly hinged to the fixing base 300, without hinge body 126.

The cup carrier 106 for supporting a cup is hinged to the lower end of the fixing base 300 via a lower hinge 112, and a cup can pass through and be secured between the pair of arms 104. The pair of arms 104 and the cup carrier 106 can rotate from an open position to a closed position (i.e., substantially 0-90 degrees) relative to the fixing base 300 via the upper hinge 110 and lower hinge 112.

Each of the pair of arms 104 may be independently coupled to the arm base 126, or the fixing base 300 in some embodiments. Each arm may be coupled to rotate via an arm hinge 116 corresponding to each arm such that each arm is capable of rotating independently from each other. The rotation of each arm may allow the space defined between the pair of arms to expand or contract in order to accommodate and secure various sizes of cups therebetween.

In some embodiments, springs 114 are provided at the arm base 126 (or at the fixing base 300, in embodiments in which the pair of arms 104 are directly hinged to the fixing base 300). Each of the springs 114 may be installed such that a biasing force is provided to a corresponding arm to return the rotation of the arm to a default rotational position. For example, rotating the pairs of arms 104 by inserting a cup that is larger than the default rotational position size may apply a contracting force to each of the springs 114. When the cup is removed, the springs 114 may force the pair of arms back to the default rotational position by applying the restorative force of the spring. In some embodiments, each of the pair of arms may have a rounded surface along the length of the arms such that larger size cups that are larger than the default rotational position size may be easily inserted while pushing the arms apart.

A universal serial bus (USB) interface 108, which can be used to electrically connect a mobile device 200 may be provided at the fixing base 102. The USB interface 108 may include a first side 108a of the USB interface 108 provided at a front side of the fixing base 102. The first side 108a may include one or more USB interface ports of different types, including but not limited to USB-A, USB-C, micro-USB, mini-USB, or the like. FIG. 1 depicts an example in which two USB ports are provided, for example one of a USB-A type, and one of a USB-C type. The first side 108a of the USB interface 108 may allow connection to a corresponding USB cable to provide power to one or more devices. The USB interface 108 may include a second side 108b of the USB interface 108, which will be discussed further below.

The cup carrier 106 may include raised side edges to define a space for resting a bottom of the cup in the cup holder 100. The raised side edges of the cup carrier 106 may also include pairs of corresponding grooves 118 on opposite sides, where each pair is aligned to provide a resting and securing position for a personal item, such as an edge of a mobile device.

As shown in FIG. 2, a mobile device, such as a smartphone, tablet, portable battery, or the like, maybe inserted into a pair of opposing grooves 118 formed in the raised side edges of the cup carrier 106. In the depicted example, a lower edge of the device is inserted into a pair of grooves, and the upper end of the device is tilted rearward. Such a configuration may be used to view videos or other content on the mobile device without the user having to hold the device in their hand.

In the embodiment shown in FIGS. 1-3, the side edges may include upward protrusions defining the grooves therebetween. One side of the upward protrusions may include an angled surface to facilitate leaning or tilting of the mobile device. For example, in FIG. 2, the upper end of the mobile device may not contact the fixing base 300, and instead the mobile device 200 may be propped up and supported by the angled surface of the groove 118. FIG. 1 depicts three pairs of securing grooves 118 to provide various angles and securing positions of the mobile device 200, however this disclosure is not limited thereto, and other configurations including fewer or additional pairs of securing grooves 118 are included in this disclosure.

In some embodiments, the upper surface of the cup carrier 106 may include raised ridges 130 which provide a resting surface against which a bottom of a device may be rested. For example, as shown in FIG. 3, a mobile device 200 may be propped up on the cup carrier 106. In the example shown in FIG. 3, the bottom of the mobile device 200 is secured against the distal wall 302 protruding upward from the cup carrier 106. However, the ridges 130 may provide various positions where the mobile device may be positioned to provide various viewing angles of the mobile device.

In some embodiments (not depicted), the cup carrier 106 may not include raised side edges and instead the grooves 118 may be defined between upward protrusions from a flat bottom surface of the cup carrier 106.

In some embodiments, the cup carrier 106 may also include an additional pair of grooves 120 which are differently shaped and positioned than the pairs of securing grooves 118. For example, FIG. 1 depicts a pair of grooves 120, referred to herein as hanging grooves 120, which are positioned closest to the fixing base 300 with respect to the other pairs of securing grooves 118. The walls defining the hanging grooves 120 may be shaped differently than the walls defining the securing grooves 118. For example, the walls defining the hanging grooves 120 may not be angled.

The hanging grooves 120 may also be positioned closest to the fixing base 300, and closest to the hinge joint between the cup carrier 106 and the fixing base 300. Due to this positioning, where the fixing base 300 is secured to a stable structure, the hanging grooves 120 may provide a stronger supporting position for personal items as compared to the remaining securing grooves 118 positioned toward the free end of the cup carrier 106. For example, the hanging grooves 120 may allow for a user to hang a bag by placing the handles of a bag across the corresponding pair of hanging grooves 120, and a significant amount of weight may be supported. Such configuration may also allow a user to support an item such as a bag at the hanging grooves 120 while simultaneously supporting a mobile device in a pair of the securing grooves 118. The cup carrier 106 may also include a raised indicator 128, which indicates that a user may place bag handles or other items across the pair of hanging grooves 120, and to differentiate the hanging grooves 120 from the rest of the securing grooves 118.

Figure 4:
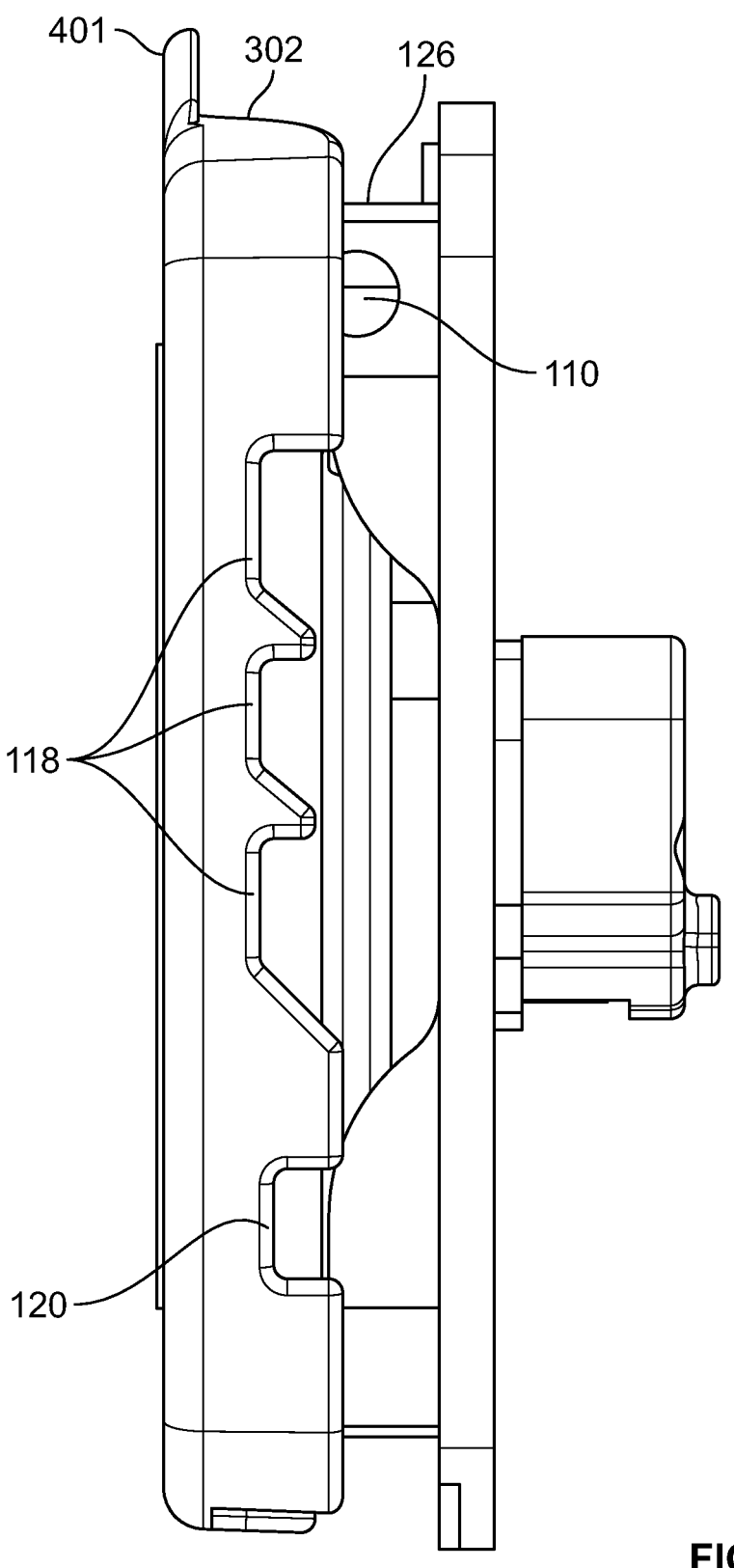
FIG. 4 is a side view of the charging cup holder in a closed position according to an embodiment of the present disclosure.

FIG. 4 is a side view of the cup holder according to an embodiment. The embodiment of FIG. 4 shows one side of the hanging groove 120 which is shaped differently from the securing grooves 118. In some embodiments, there may be multiple pairs of hanging grooves 120.

The embodiment of FIG. 4 shows the cup carrier 106 rotated fully toward the fixing base 102 to be in a closed position. In the closed position, the distal wall 302 may slide over, or otherwise cover at least a portion of the hinge body 126 provided at the upper side of the fixing base 102 to hinge the pair of arms. In such a configuration, the cup holder may be folded closed into a compact position, while also protecting the covered components, including the hinge body 126 and pair of arms 104, which may be more easily damaged.

Figure 6:
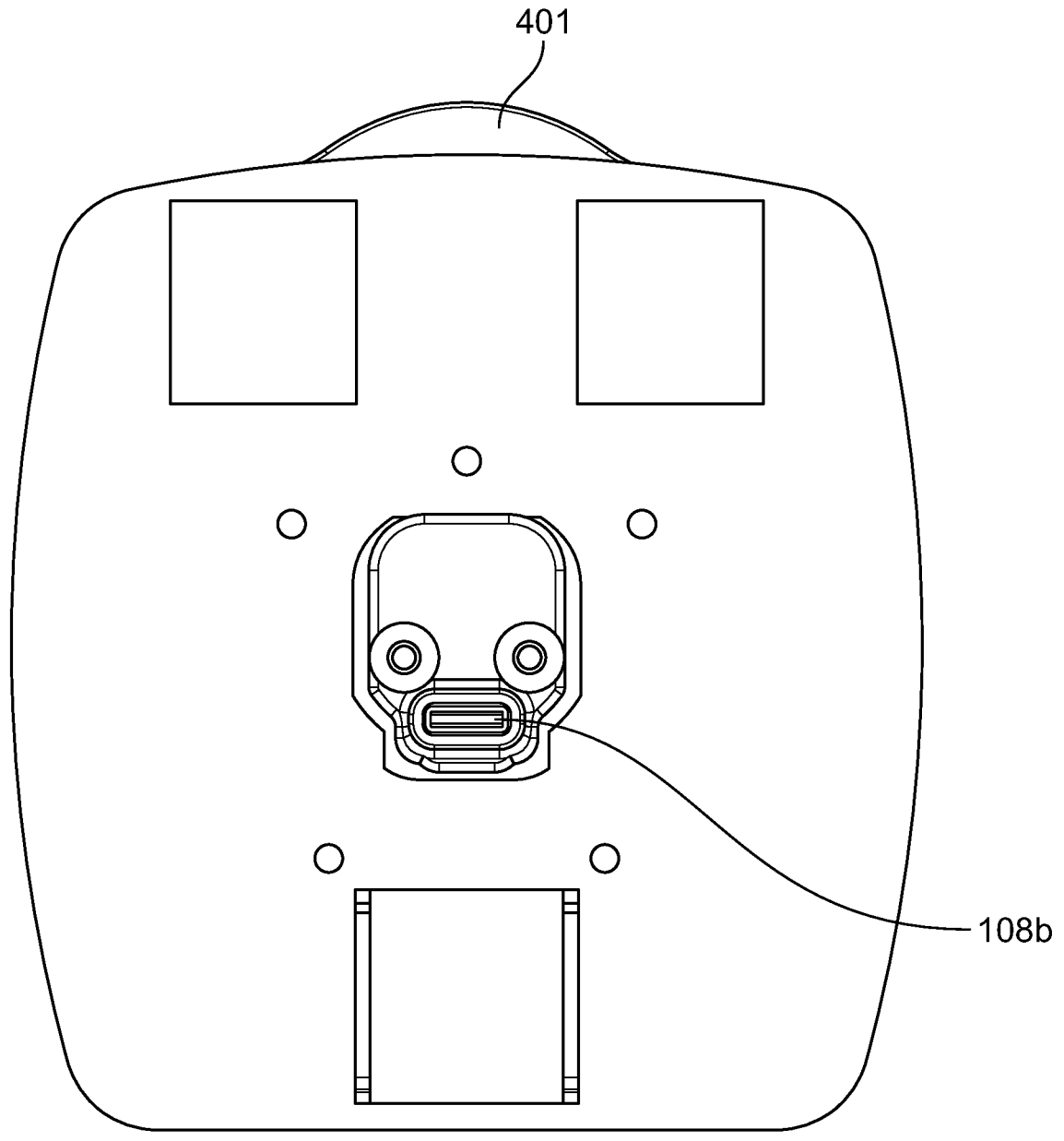
FIG. 6 is a rear view of the charging cup holder in a closed position according to an embodiment of the present disclosure.

In an embodiment, the cup carrier 106 may include a protruding lip 401 at a distal end of the cup carrier with respect to the lower hinge, where the protruding lip 401 provides a gripping surface for a user. The protruding lip 401 may be used to pull the cup carrier 106 open from the closed position, or may be used to push the cup carrier 106 toward the closed position. The protruding lip 401 may be convexly curved and extend further past other components of the cup holder in the closed position to provide for easy grip and easy access by a user, as shown in FIG. 6. In some embodiments, the distal wall 302 may include an opening in the wall at a position corresponding to the protruding lip 401. This may provide for further accommodation of a user's finger when gripping the protruding lip 401 for moving the cup carrier 106 to the open position.

Figure 5:
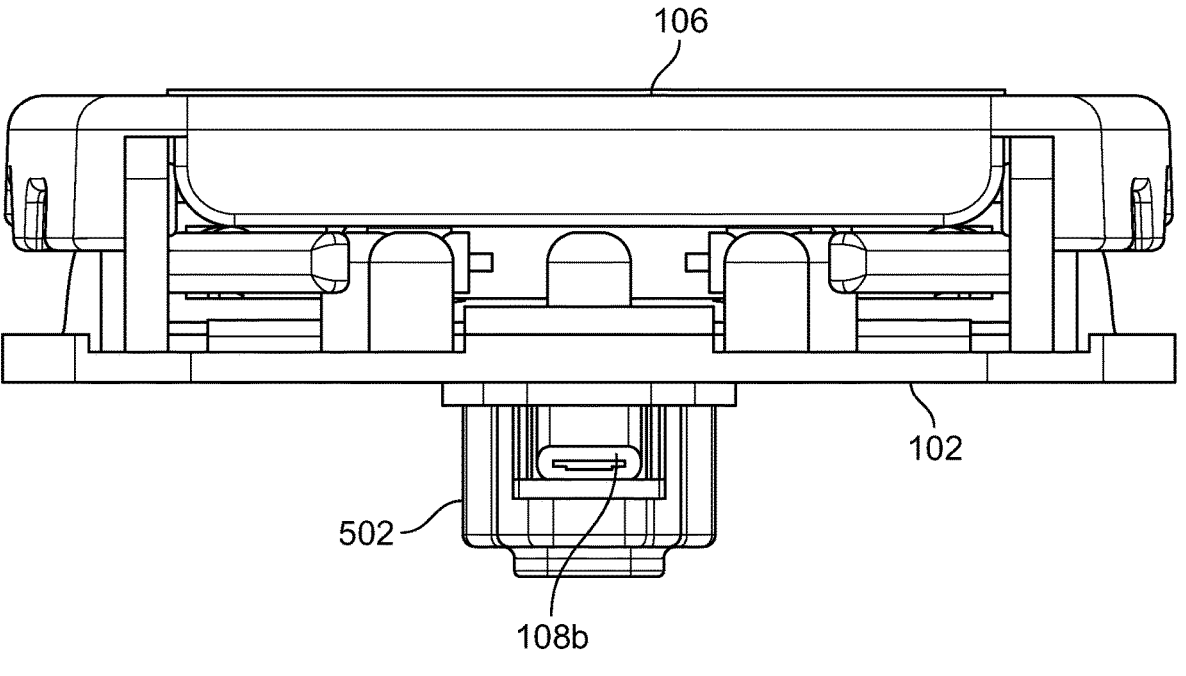
FIG. 5 is a bottom view of the charging cup holder in a closed position according to an embodiment of the present disclosure.

FIG. 5 shows a bottom view and FIG. 6 shows a rear view of a cup holder according to an embodiment of the present disclosure. The cup holder may include a mounting connector 502 positioned at a rear side of the fixing base 102. The mounting connector 502 may protrude a certain amount such that when the fixing base 102 is mounted to a mounting surface of a structure, such as a side of luggage, the mounting connector 502 may protrude through a through-hole formed in the mounting surface that corresponds to a shape of the mounting connector 502.

The mounting connector 502 may include the second side 108*b* of the USB interface. The second side 108*b* of the USB interface 108 may include one or more USB ports for plugging in an electronic device, or a power source such as a battery for powering an electronic device that is plugged into the first side 108*a* of the USB interface. Thus, the USB interface 108 may act as a connector for transferring power between a power source plugged into one side 108*a*/108*b* of the USB interface 108 to the other side 108*b*/108*a* of the USB interface 108. For example, a battery may be connected to the second side 108*b* of the USB interface 108. When a personal mobile device, such as a cellphone, is plugged into the first side 108*a* of the USB interface 108, power may be provided from the battery to the mobile device. When a USB power cable is then inserted into the first side 108*a* of the USB interface 108, the battery that is connected to the second side 108*b* may receive power through the USB interface 108 for recharging the battery.

The second side 108*b* of the USB interface 108 may include more than one USB port, and FIG. 5 and FIG. 6 show an example in which two USB ports are provided, for example one of a USB-A type at a bottom side of the mounting connector 502, and one of a USB-C type at a rear side of the mounting connector 502. In some embodiments, more than one device and/or more than one power source may be plugged into the USB interface 108 simultaneously.

Figure 7:
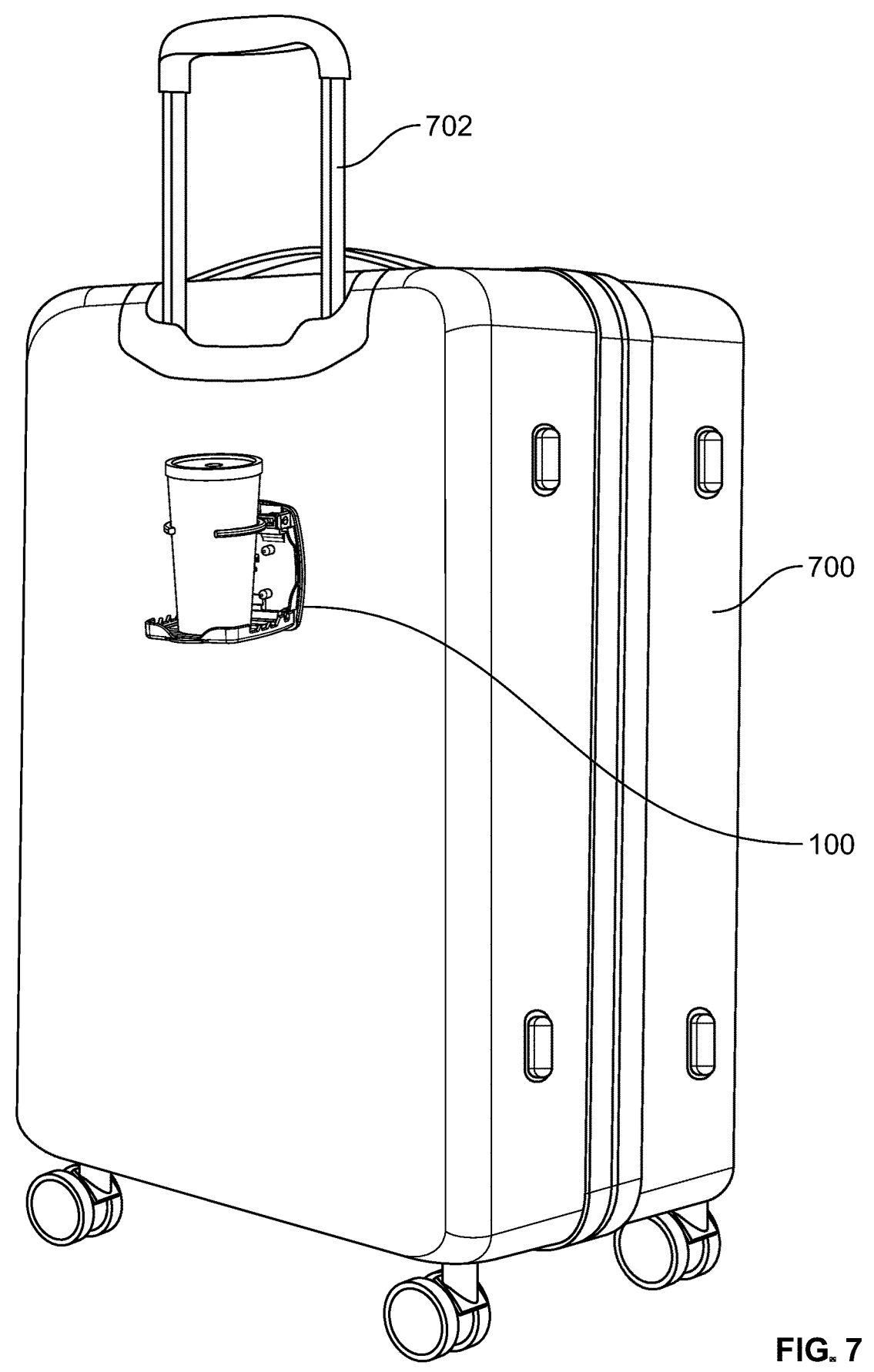
FIG. 7 is a rear view of the charging cup holder provided at a side of a rolling luggage article according to an embodiment of the present disclosure.

FIG. 7 shows an example of an implementation of the cupholder according to an embodiment of the present disclosure. The charging cup holder 100 may be installed at a side of a personal travel luggage, such as a rolling luggage bag 700. The example shows the charging cup holder 100 installed at a rear of the rolling luggage bag 700, however other implementations and positions are considered. The mounting connector 502 may be inserted into an opening at the side of the luggage bag 700 and secured via coupling mechanisms (not pictured), and a battery power source may be installed inside the side of the luggage bag 700. In some embodiments, the battery power source may be installed in a compartment adjacent to a space into which the telescoping handle 702 is stored when retracted and not in use. The cup carrier 106 may be folded to a closed position such that the charging cup holder is flat, or substantially flat, to the surface of the side of the luggage, so as not to interfere with the user's use of the luggage bag during travel.

It should be understood that, in the description of the utility, terms used to reference the orientation or positional relationship are based on the orientation or positional relationship in the drawings, such as "upper", "lower", "front", "rear", "left", "right", "vertical", "horizontal", "bottom", "inner", "outer", etc., and they are only used to facilitate the description of the present invention and simplify the description, but not to indicate or suggest the specific orientation of the arrangement or member or to suggest it must be configured or operated in a specific orientation, and therefore, they should not be deemed as limiting.

Although specific embodiments of the present invention have been described above, but it should be understood by the skilled in the art that those are merely illustrations, and the scope of protection of the present invention is defined by appended claims. It will be apparent to those skilled in the art that variants and modifications can be made in the embodiments without departing from the principles and essential characteristics of the present invention, and these variants and modifications are within the scope of the present invention.

What is claimed is:
1. A charging cup holder comprising:
a fixing base;
a pair of arms hinged to an upper end of the fixing base and configured to secure sides of a cup;

a cup carrier hinged to a lower end of the fixing base and comprising a flat upper surface configured to support a bottom of the cup; and a USB interface provided at the fixing base and configured to transfer electric power from a second side of the USB interface to a first side of the USB interface, wherein the cup carrier comprises opposing raised side edges extending upward from opposing sides of the flat upper surface and shaped to form pairs of corresponding securing grooves formed at the raised side edges to provide a securing position for a personal item placed across a corresponding pair of securing grooves, and wherein the flat upper surface of the cup carrier comprises a plurality of parallel raised ridges each configured to provide a resting surface for a bottom side of the personal item when a top side of the personal item is propped up against the fixing base and a width of the personal item is less than a width between the raised side edges such that the personal item is not being secured by the securing grooves and such that a resting angle of the personal item may be varied by the bottom side of the personal item being rested on different raised edges of the plurality of parallel raised ridges, and wherein the pair of arms is configured to hinge downward to a closed position toward the fixing base when the personal item is being secured by the securing grooves or being rested on the flat upper surface of the cup carrier.

2. The charging cup holder of claim 1, wherein the USB interface is configured to transfer the power from a power source electrically connected to the second side of the USB interface to a mobile device electrically connected to the first side of the USB interface.

3. The charging cup holder of claim 2, wherein each of the securing grooves is separated by an upward protrusion to define the securing grooves therebetween.

4. The charging cup holder of claim 3, wherein the upward protrusion is formed to have an angled edge angled toward the fixing base to allow tilting of the mobile device against the angled edge.

5. The charging cup holder of claim 1, wherein the cup carrier is configured to hinge upward to a closed position toward the fixing base to cover the pair of arms when the pair of arms are hinged downward to the closed position.

6. The charging cup holder of claim 5, wherein the fixing base comprises an upper hinge portion to which the pair of arms are coupled, wherein each of the pair of arms are independently laterally rotatable with respect to the upper hinge portion to secure various cup sizes between the pair of arms.

7. The charging cup holder of claim 6, wherein the upper hinge portion comprises a pair of springs corresponding to the pair of arms to apply a biasing force to return rotation of the arms to a default position.

8. The charging cup holder of claim 6, wherein a front side of the cup carrier comprises at least one wall protruding upward when the cup carrier is in an open position with respect to the fixing base.

9. The charging cup holder of claim 8, wherein the at least one wall of the front side of the cup carrier covers at least a portion of an upper surface of the upper hinge portion of the fixing base when the cup carrier is in the closed position.

10. The charging cup holder of claim 9, wherein the cup carrier comprises a protruding lip to facilitate opening the cup carrier from the closed position, and wherein the at least one wall is divided by an opening corresponding to a position of the protruding lip.

11. The charging cup holder of claim 8, wherein the at least one wall is configured to secure a lower portion of a mobile terminal being propped up against the fixing base.

12. The charging cup holder of claim 3, wherein the raised side edges of the cup carrier are further shaped to form a pair of corresponding hanging grooves positioned closest to the fixing base with respect to the pairs of corresponding securing grooves.

13. The charging cup holder of claim 12, wherein the pair of corresponding hanging grooves are shaped differently from the pairs of corresponding securing grooves, and are positioned closest to the fixing base to provide a securing position for hanging a handle of a bag.

14. A luggage article comprising a charging cup holder, the luggage article comprising:

a body having a top face, a bottom face, and a plurality of side faces, at least two wheels disposed at the bottom face of the body;

an extendable handle; and a charging cup holder disposed at one of the plurality of side faces, the charging cup holder comprising:

a fixing base;

a pair of arms hinged to an upper end of the fixing base and configured to secure a cup;

a cup carrier hinged to a lower end of the fixing base and comprising a flat upper surface configured to support a bottom of the cup; and a USB interface provided at the fixing base and configured to transfer electric power from a second side of the USB interface to a first side of the USB interface, wherein the cup carrier comprises opposing raised side edges extending upward from opposing sides of the flat upper surface and shaped to form pairs of corresponding securing grooves formed at the raised side edges to provide a securing position for a personal item placed across a corresponding pair of securing grooves, and wherein the flat upper surface of the cup carrier comprises a plurality of parallel raised ridges each configured to provide a resting surface for a bottom side of the personal item when a top side of the personal item is propped up against the fixing base and a width of the personal item is less than a width between the raised side edges such that the personal item is not being secured by the securing grooves and such that a resting angle of the personal item may be varied by the bottom side of the personal item being rested on different raised edges of the plurality of parallel raised ridges, and wherein the pair of arms is configured to hinge downward to a closed position toward the fixing base when the personal item is being secured by the securing grooves or being rested on the flat upper surface of the cup carrier.

15. The luggage article of claim 14, wherein the USB interface is configured to transfer the power from a power source electrically connected to the second side of the USB interface and provided internal to the one of the plurality of side faces, to a mobile device electrically connected to the first side of the USB interface.

16. The luggage article of claim 14, wherein the extendable handle extends along a rear face of the plurality of side faces, and the charging cup holder is provided at the rear face.

* * * * *